US011168413B2

(12) United States Patent
Witt et al.

(10) Patent No.: US 11,168,413 B2
(45) Date of Patent: Nov. 9, 2021

(54) FABRIC THAT PASSES COLONNADED LIGHT

(71) Applicant: Microsoft Technology Licensing, LLC, Redmond, WA (US)

(72) Inventors: Eric Paul Witt, Redmond, WA (US); Kelly M. Bogan, Redmond, WA (US); Alexander Norman Bennett, Seattle, WA (US); Rachael Sara Bell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 16/192,476

(22) Filed: Nov. 15, 2018

(65) Prior Publication Data

US 2020/0157711 A1 May 21, 2020

(51) Int. Cl.
*D03D 15/00* (2021.01)
*D02G 3/44* (2006.01)
*D03D 11/00* (2006.01)
*F21V 8/00* (2006.01)

(52) U.S. Cl.
CPC ............. *D02G 3/441* (2013.01); *D03D 11/00* (2013.01); *D03D 15/00* (2013.01); *G02B 6/001* (2013.01); *D10B 2401/20* (2013.01); *F21V 2200/15* (2015.01)

(58) Field of Classification Search
CPC .................................................... D03D 15/00
See application file for complete search history.

(56) References Cited

U.S. PATENT DOCUMENTS

| 4,234,907 A | * | 11/1980 | Daniel | D02G 3/441 |
| | | | | 362/556 |
| 4,537,469 A | * | 8/1985 | Kircher | G01M 5/0033 |
| | | | | 385/13 |
| 5,906,004 A | | 5/1999 | Lebby et al. | |
| 6,851,844 B2 | | 2/2005 | Guy | |
| 7,988,525 B2 | | 8/2011 | Garbos et al. | |
| 2006/0087832 A1 | | 4/2006 | Peng et al. | |

(Continued)

FOREIGN PATENT DOCUMENTS

| DE | 3506301 A1 | 9/1986 |
| DE | 102009023658 A1 | 12/2010 |
| DE | 202009011031 U1 | 2/2011 |

(Continued)

OTHER PUBLICATIONS

Jansen, Barbara, "Textile Light Design", In Proceedings of Cumulus Conference on Hemispheric Shifts across Learning, Teaching and Research, Nov. 12, 2009, pp. 1-13.

(Continued)

*Primary Examiner* — Andrew T Piziali
(74) *Attorney, Agent, or Firm* — Holzer Patel Drennan

(57) ABSTRACT

A method for manufacturing fabric that passes colonnaded light is described herein. The method includes weaving a first yarn and a second yarn to create a woven fabric and weaving a light emitting yarn through the woven fabric, wherein the light emitting yarn creates a plurality of loops of light emitting yarn on at least one side of the woven fabric. The method also includes finishing the woven fabric to create columns of light emitting yarn throughout the fabric by removing the plurality of loops.

21 Claims, 12 Drawing Sheets

(56) References Cited

U.S. PATENT DOCUMENTS

2010/0130081 A1* 5/2010 Fischer .................. B29C 70/30
 442/181
2010/0329606 A1 12/2010 Wang

FOREIGN PATENT DOCUMENTS

| DE | 202011004546 U1 | 6/2011 |
| DE | 102012006712 A1 | 7/2013 |
| DE | 102015101030 B3 | 3/2016 |

OTHER PUBLICATIONS

"International Search Report and Written Opinion Issued in PCT Application No. PCT/US19/059574", dated Feb. 6, 2020, 15 Pages.

* cited by examiner

300A

300B

400A

400B

FABRIC THAT PASSES COLONNADED LIGHT

BACKGROUND

Electronic devices can be located throughout any number of spaces with varying uses. In some examples, the electronic components may include a display. The display may be an always on display, or the display can turn on or be illuminated as needed to render information. The electronic components can include, for example smart hubs, smart thermostats, televisions, alarm clocks, stereo systems, and the like. The electronic devices may be in various form factors and sizes.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for manufacturing a fabric that passes colonnaded light is described. The method includes weaving a first yarn and a second yarn to create a woven fabric. The method also includes weaving a light emitting yarn through the woven fabric, wherein the light emitting yarn creates a plurality of loops of light emitting yarn on at least one side of the woven fabric. Finally, the method includes finishing the woven fabric to create columns of light emitting yarn throughout the fabric by removing or reshaping the plurality of loops.

In another embodiment described herein, a fabric that passes colonnaded light is described. The fabric comprises a first yarn, a second yarn, and a light emitting yarn. The first yarn and the second yarn are woven to create a woven fabric. The light emitting yarn is woven throughout the woven fabric and the woven fabric with the light emitting yarn is finished to create columns of the light emitting yarn throughout the woven fabric.

Another embodiment described herein includes an electronic device. The electronic device includes at least one display configured to render information via light emitted by a plurality of pixels. The electronic device also includes a fabric that passes colonnaded light positioned to cover the at least one display. The fabric is a woven fabric that comprises columns of a light emitting yarn throughout the fabric. The light emitting yarn is to capture the light emitted by the plurality of pixels at a first end, transmit the light through the fabric via the light emitting yarn, and release the light at a second end of the light emitting yarn.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1A:
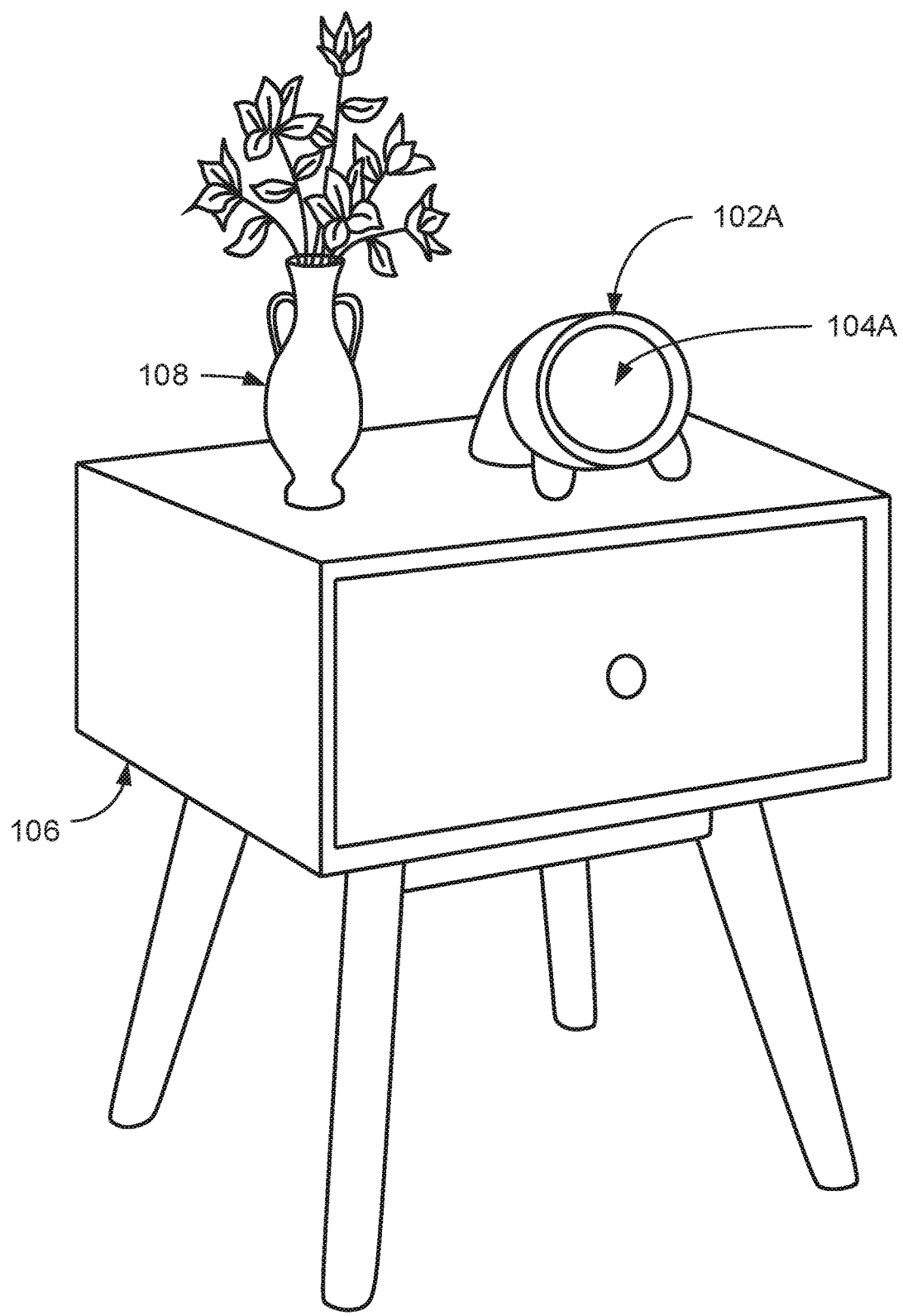
FIG. 1A is an illustration of design elements including an inactive electronic device in a space.

Fabric is often used as an interior design element. For example, fabrics can be applied to furniture, decorative items such as pillows, and as protective covering for various elements in a room. Techniques described herein provide a fabric that passes colonnaded light. As used herein, a colonnaded light is light that is visible at regular intervals, in columns. According to the present techniques, the columns of light emitting yarn enable light to pass through the fabric with reduced dispersion so that the patterns, images, and text formed below the fabric are perceived on the other side without much distortion. The patterns, images, and text formed below the fabric may be rendered by a display of the computing device.

In some embodiments, manufacturing a fabric that passes, transmits, or propagates colonnaded light comprises generating at least one column that passes light from a first side to a second side of a fabric. In examples, a process of manufacturing a fabric that passes, transmits, or propagates colonnaded light includes weaving a first yarn and a second yarn to create a woven fabric. The first yarn and the second yarn may be, for example, a weft yarn and a warp yarn. A light emitting yarn may be simultaneously woven in the fabric created by the first yarn and the second yarn. The manufacturing process can also include eliminating loops of the light emitting yarn from the fabric to create at least one column of light emitting yarn in the woven fabric. The loops may be eliminated or reshaped in a finishing process. Reshaping the loops enables exposure of light from the light emitting yarn. Furthermore, the manufacturing process includes finishing the woven fabric, wherein finishing the fabric comprises encapsulating the fabric prior to removing the plurality of loops. Finishing the woven fabric may also include splitting or skiving the fabric.

Simultaneously weaving a light emitting yarn through the woven fabric includes weaving at least one additional layer of weft yarns with the light emitting yarn. Further, the manufacturing process may include the woven fabric as an inner fabric, and simultaneously weaving at least one additional layer of weft yarns with the light emitting yarn, and finishing the woven fabric by removing the one additional layer to create columns of light emitting yarn in the woven fabric with an optical core of the light emitting yarn exposed. Finishing the woven fabric may also include flattening the fabric. In some cases, the first and second yarn may be woven to create at least a portion of the inner fabric. The light emitting yarn may then be woven with the portion of the inner fabric. Additionally, in some cases the inner fabric is supplied from a third party, and the light emitting yarn is woven through the supplied inner fabric. The fabric may then be finished as described herein.

Further, the manufacturing process includes weaving the light emitting yarn between thirty and thirty-five picks per inch through the woven fabric. The woven fabric may be a plain-woven fabric, a twill woven fabric, a satin woven fabric, or any combination thereof. The light emitting yarn may include an optically transparent core to transmit light from being gathered at a first end of the light emitting yarn and released at a second end of the light emitting yarn.

The techniques described herein can produce a fabric configured to bond to at least a display of electronic components. The fabric may also completely surround an enclosure of the electronic device. Moreover, the fabric may completely cover the electronic device such that the electronic device is completely obscured by the fabric. Accordingly, the fabric enables an electronic device to blend completely into the décor of any space via the fabric, while enabling information from a display of the electronic device to be available when rendered.

The fabric described herein enables a seamless, visually simple design while the functionality of the electronic device remains. In particular, while textiles such as the fabric that passes colonnaded light are easily integrated into home and office spaces, the present techniques enable speakers, microphones and other components of electronic devices to be designed with cosmetics in mind. The fabric described herein does not eliminate any functionality of an electronic device. The fabric as described herein enables an electronic device to be aesthetically invisible, displaying information only as needed. Aesthetically invisible refers to the ability to blend with a space while hiding the particular type or functionality of the device being concealed by the fabric. When the electronic device is in an inactive state, it is a seamless design component of the space. In an active state, the electronic device provides information via the fabric described herein.

Figure 6:
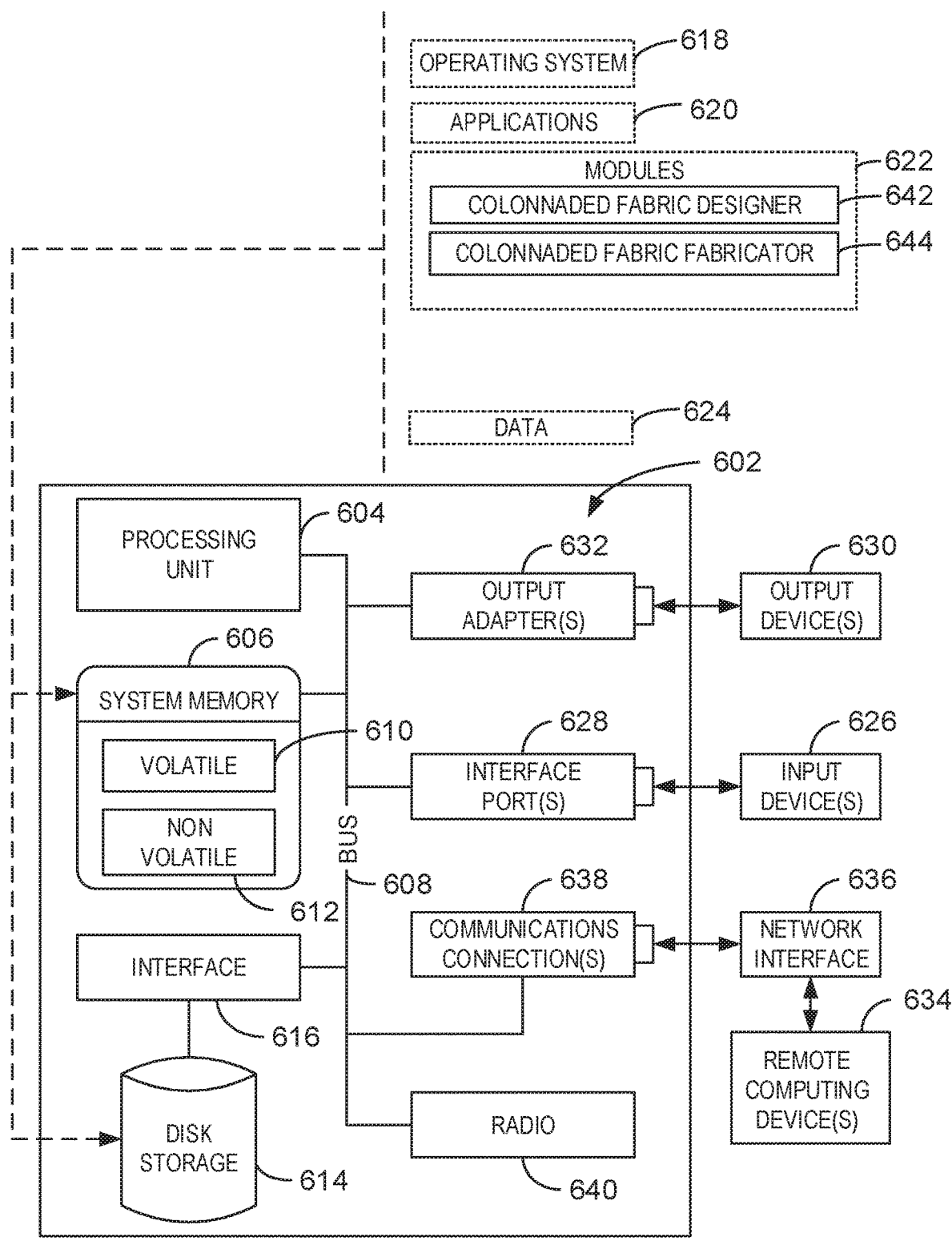
FIG. 6 is a block diagram of an example of a computing system that can be used to fabricate a fabric that passes colonnaded light.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 6 discussed below, provides details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device.

FIG. 1A is an illustration of design elements including an inactive electronic device in a space 100A. In examples, the space may be an interior space, and exterior space, and the like. While particular design elements are illustrated, any design element may be present. For example, in the space 100A, the electronic device is a smart clock 102A. The smart clock 102A includes a display 104A. The space 100A further includes a side table 106 and a vase 108 with flowers. While the electronic device is described as smart clock 102A, any electronic device may be used. In examples, the electronic device may be a digital thermometer that is to display various temperatures, such as the indoor temperature in various zones of an indoor space, an average indoor temperature, a local outdoor temperature, or a remote outdoor temperature. In other examples, the electronic device may be a home assistant, thermostat, virtual assistant, smart home device, security camera, smart home hub, and the like. Moreover, the electronic device may be positioned on the floor, on a table top, mounted to a wall, or any other position. The electronic device may render images or information in response to voice commands. The electronic device may be motion activated, and can render information in response to motion occurring near the electronic device.

The electronic device may have a plurality of operational states. In an inactive state, a display of the electronic device may not render any information. In some cases, power may be reduced or off to the display. In an active state, the electronic device will present information on the display. In FIG. 1A, the smart clock 102A is illustrated without fabric, in an inactive state, where no information is rendered on the display 104A. When the display 104A has no rendered information visible on the display, no light may be emitted from the display. The smart clock 102A may have a design that does not compliment the décor of the space in which it is located. For example, the color of the smart clock may clash with other colors presently used in the space 100A. Moreover, devices such as the smart clock 102A often appear visually similar, regardless of the difference in manufacturers or brands.

Figure 1B:
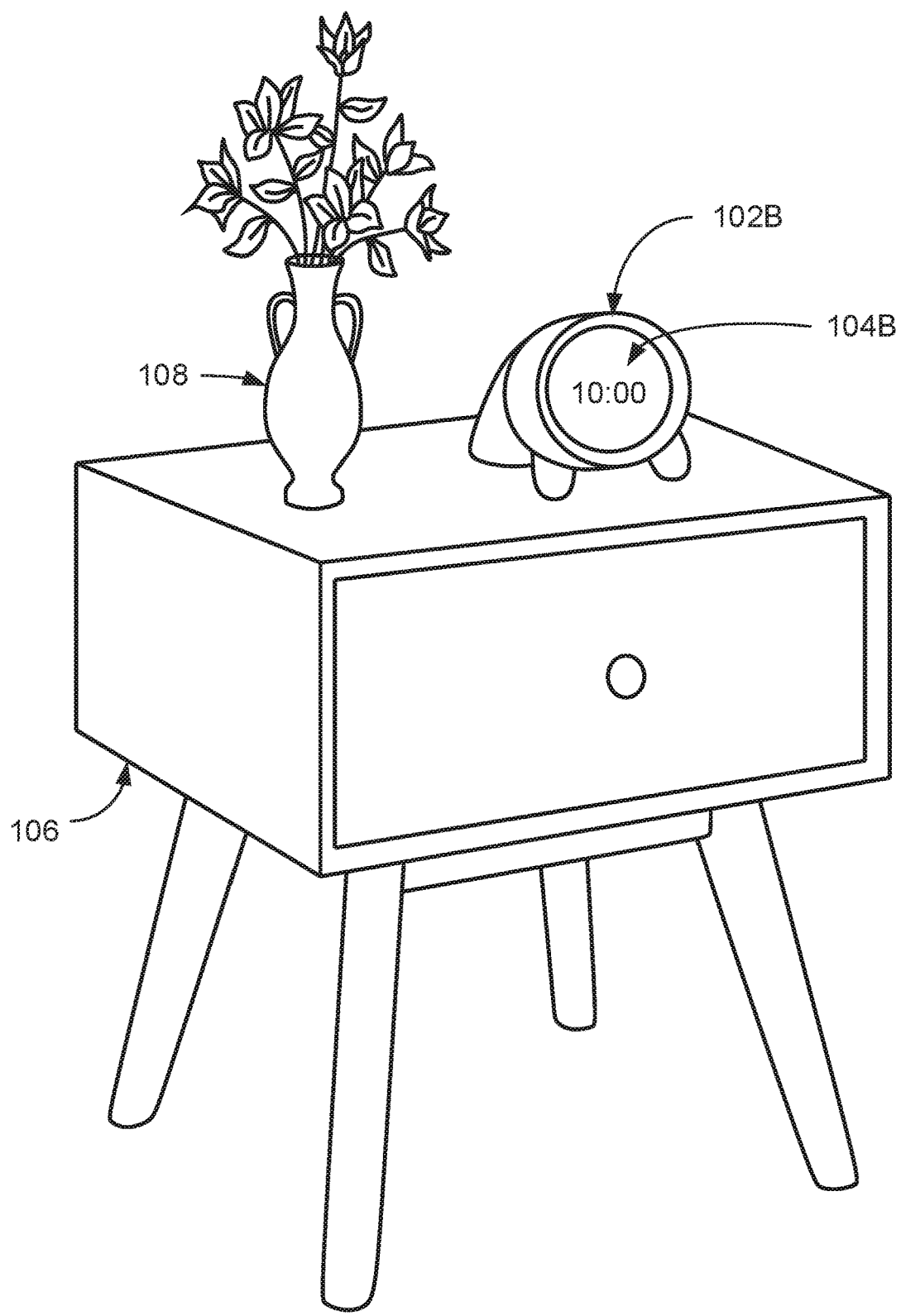
FIG. 1B is an illustration of design elements including an active electronic device in a space.

FIG. 1B is an illustration of design elements including an active smart clock in a space 100B. In FIG. 1B, the smart clock 102B is illustrated without a fabric and with information rendered on the display 104B. As illustrated, the display 104B renders the time as 10:00. While particular information has been illustrated as rendered on the display 104B, any information can be rendered on the display 104B. For example, the display 104B may render other information on the display, such as a power level, wireless connections status, calendar date, and the like. The display 104B may be a light emitting diode (LED) display.

The smart clock 104B be activate by a voice command, or by a touch of the user. The smart clock 104B may also be motion activated. After activation, the smart clock may return to an inactive state after a predetermined time period. Thus, in some cases the smart clock 102B renders information in response to activation by a user. In other examples, the smart clock 102B may illuminate the display 104B to render information at specified intervals. Additionally, in examples, the smart clock 102B may render information from a third-party notification service, where a notification is pushed to the device. A user can control the timing of the pushed notifications, or the notifications can be pushed through as desired by a user.

Figure 1C:
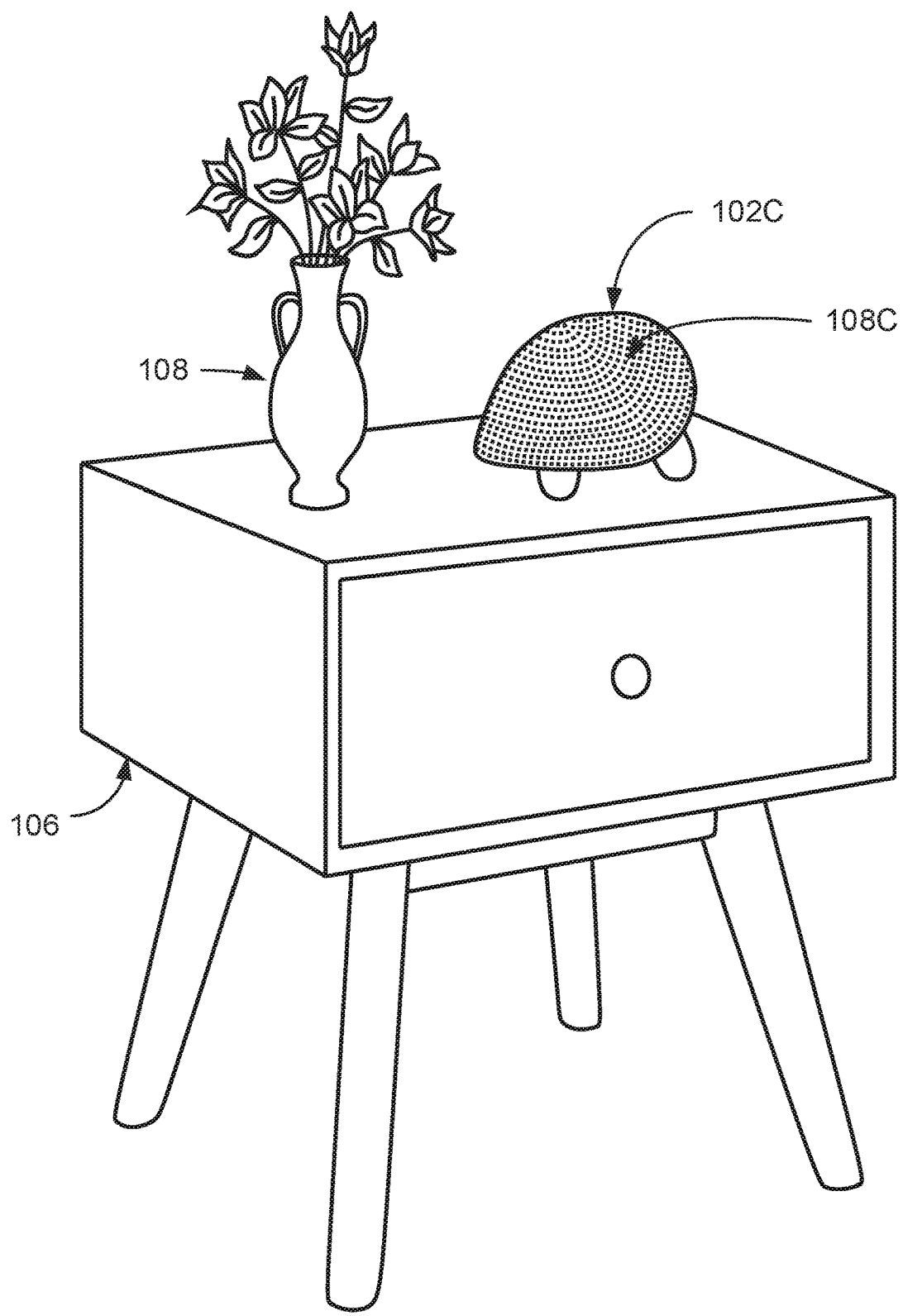
FIG. 1C is an illustration of design elements including a fabric covered inactive electronic device in a space.

FIG. 1C is an illustration of design elements including a fabric covered inactive smart clock in a space 100C. In FIG. 1C, the smart clock 102C is illustrated with a fabric and no information is illuminated on the display. As illustrated, the device is covered by the fabric 108C. Accordingly, only the shape of the smart clock 102C is visible beneath the fabric 108C. Moreover, the particular display of the smart clock 102C is not visible, as it is covered by the fabric 108C. In the example of FIG. 1C, the display of the smart clock 102C has no rendered information visible on the display, and no light is emitted from the display. Thus, in FIG. 1C, there is nothing to view via the fabric 108C. The smart clock 102C is covered with a design that can be selected by the user. The design may be interchangeable as desired by the user. In some cases, the design of the fabric may compliment the décor of the space in which it is located. In this manner, electronic devices such as smart clock 102C can be integrated into the particular design of a space. As used herein, the design refers aesthetic characteristics such as a color, print, weave, or other visual attribute imparted to elements in the space.

Figure 1D:
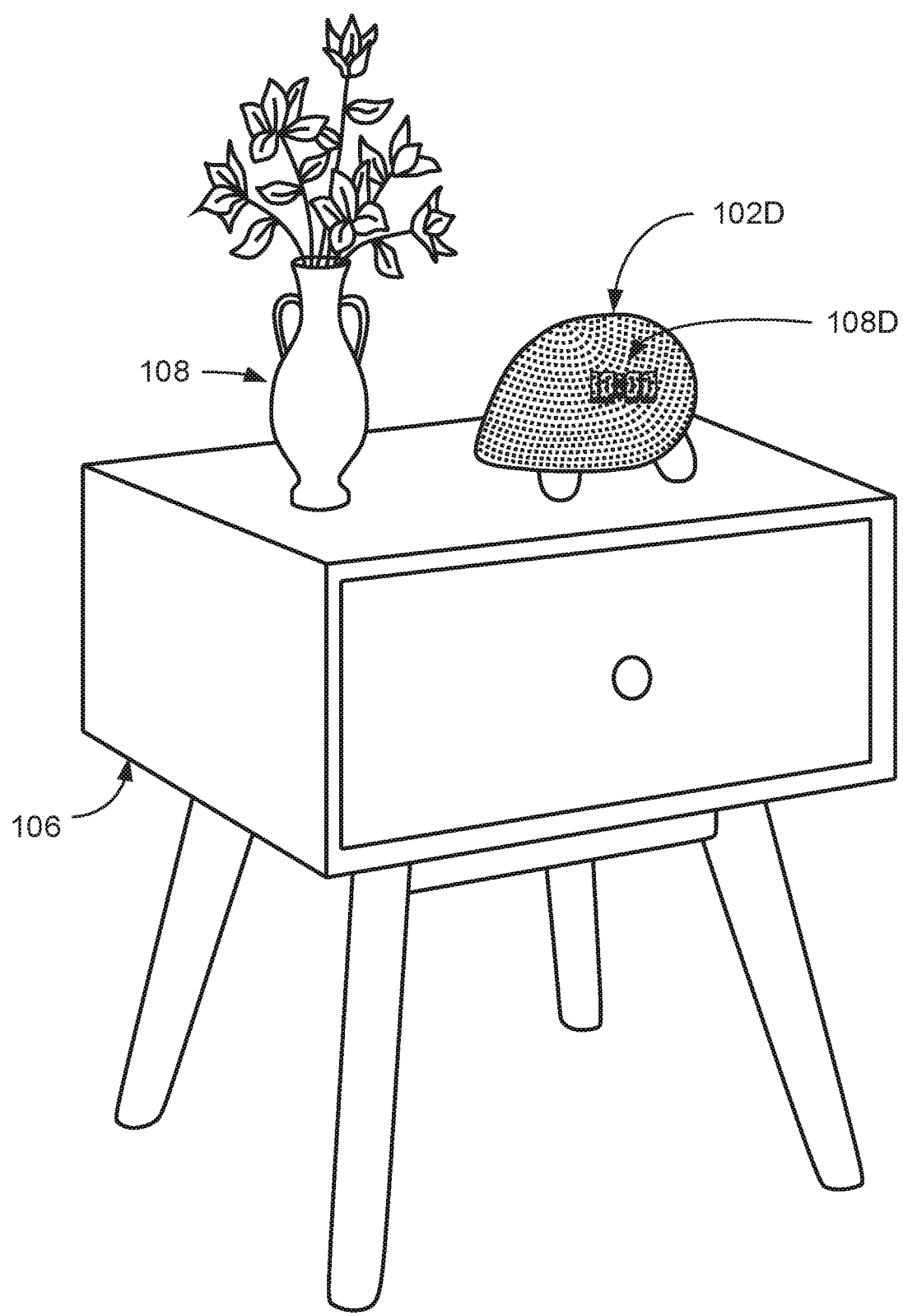
FIG. 1D is an illustration of design elements including a fabric covered active electronic device in a space.

FIG. 1D is an illustration of design elements including a fabric covered active smart clock in a space 100D. In FIG. 1D, a smart clock 102D is illustrated with a fabric 108D and with information illuminated by the hidden display of the smart clock 102D. Similar to FIG. 1B, the display of the smart clock 102D underneath the fabric 108B renders information, such as a time at 10:00. The display may render other information on the display, such as a power level, wireless connections status, calendar date, and the like through the fabric 108D. Again, the smart clock 102D be activated by a voice command, or by a touch of the user. After activation, the smart clock 102D may turn off the display after a predetermined time period. Thus, in some cases the smart clock 102D renders information in response to activation by a user. In other examples, the electronic device may illuminate the display to render information at specified intervals.

As illustrated, the information rendered by display passes through the fabric 108D. The fabric 108D may include short columns of an optical yarn that transmits light. The columns may lie substantially perpendicular to a display that emits light to be propagated by the fabric. As used herein, the transmission or propagation of light refers to light entering the optical yarn at one end, traveling the length of the optical yarn, and being emitted or released at the other end of the yarn. The optical yarn as described herein may not reflect or absorb the light. In particular, an optical yarn according to the present techniques may minimize the amount of light reflected from the optical yarn. Further, the optical yarn reduces attenuation of light as it propagates through the yarn. Additionally, substantially perpendicular refers to a position of the optical yarn that is to propagate light through a fabric such that a majority of light rays from the display are able to enter the optical yarn for propagation through the fabric. In some cases, substantially perpendicular may refer to the columns of yarn that are to propagate light forming a ninety-degree angle with the surface of the display. The ninety-degree angle may be measured at each position of a display. As a result, when the display is curved, the fabric pay be positioned to mimic the curve of the display to maintain an approximate ninety-degree angle between a tangent line of the display and a column of the fabric.

The fabric may be bonded to the electronic device. In examples, the bonding may occur at particular points along the device. The bond may include a glue or other adhesive. The bond may also include a plurality of hooks or buttons to ensure the fabric stays attached to the device. Further, in examples the optical yarn is woven into the fabric such that the yarn occurs at regular intervals throughout the fabric. The percentage of optical yarn woven throughout the fabric can be changed to vary the amount of light allowed to pass through the fabric. The higher the percentage of optical yarn woven in a fabric, the higher the amount of light that passes through the fabric. The lower the percentage of optical yarn woven in a fabric, the lower the amount of light that passes through the fabric. Additionally, the fabric may include various holes or openings to allow unobstructed access to components of the electronic device covered by the fabric, such as a microphone, battery, and the like. Moreover, openings may be positioned throughout the fabric to enable air vents for cooling, or to expose the feet or legs of the device so that the feet or legs of the device can contact the surface on which the device rests. The openings may also enable access to mounting hardware present on the housing of the device so that the device may be hung or mounted on a wall or other vertical surface. For example, the feet of the smart clocks 102C and 102D may extend through an opening in the fabric 108C and 108d, respectively.

Figure 2:
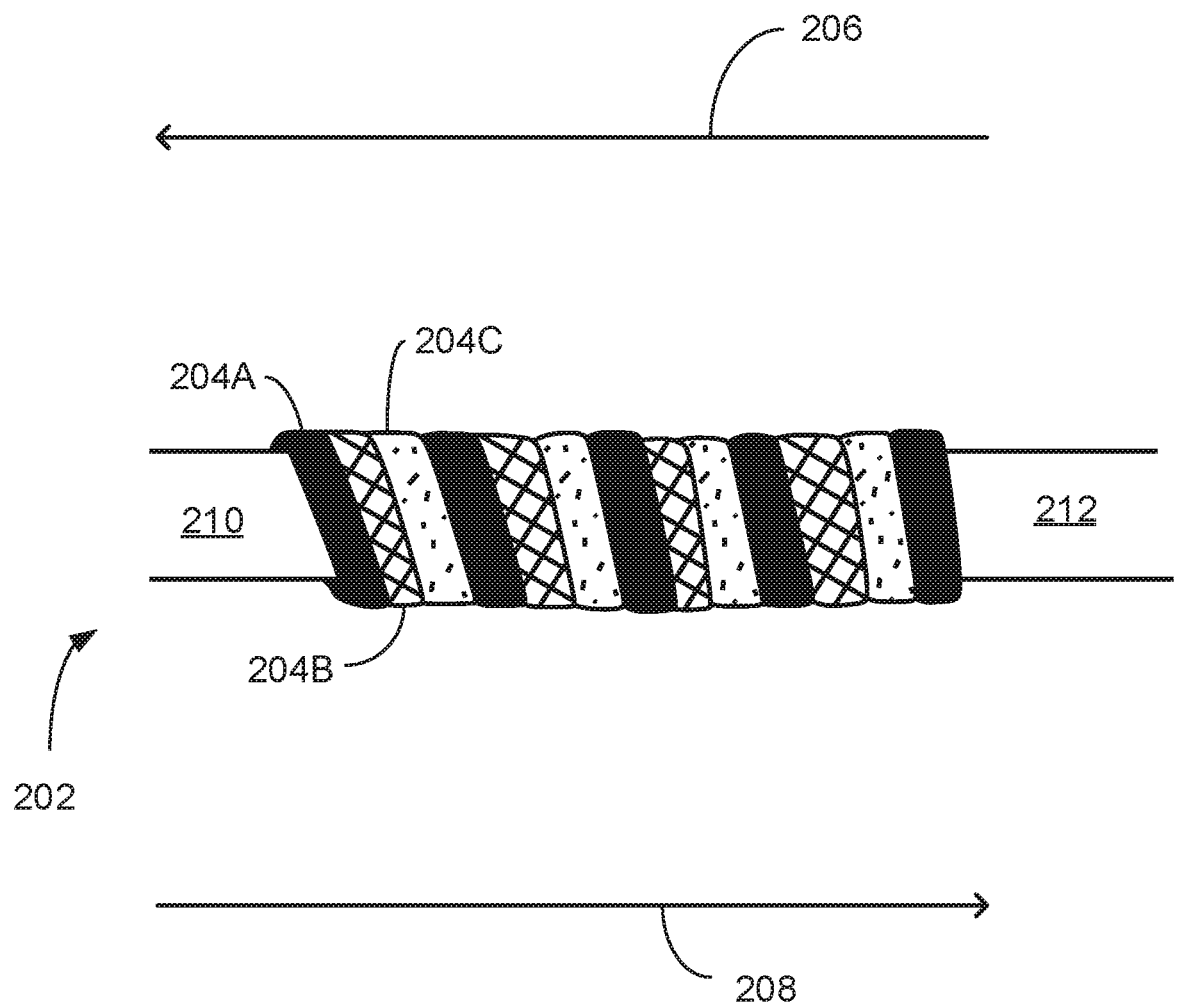
FIG. 2 is an illustration of a light emitting yarn.

FIG. 2 is an illustration of a light emitting yarn 200. In examples, the light emitting yarn 200 is an optical yarn that can transmit or propagate light. As used herein, the light emitting yarn is not a light source that generates light. Instead, the light emitting yarn transmits light from a light source along a length of the light emitting yarn. In examples, the light emitting yarn 200 includes an optically transparent fiber that is able to transmit light from a light source, such as an LED display. The light emitting yarn 200 may be formed such that light is prevented from escaping from the sides of the light emitting yarn 200. In some cases, the light emitting yarn 200 may be a polymethyl methacrylate (PMMA) yarn. The fibers of the light emitting yarn 200 may be positioned such that the yarn extends from a light source at approximately a ninety-degree angle.

The light emitting yarn 200 includes a core fiber 202. The core fiber 202 may be any optically transparent fiber that can transmit, propagate, or pass light. The core fiber 202 may be spun with a plurality of other fibers 204A, 204B, and 204C. While a particular number of other fibers have been illustrated, any number of other fibers can be used. The plurality of other fibers 204A, 204B, and 204C are spun with the core fiber 202 by twisting the other fibers 204A, 204B, and 204C with the core fiber 202 to form a single light emitting yarn 200.

As user herein, optically transparent refers to the ability to transmit light. In some examples, the light emitting yarn 200 is spun such that the core fiber 202 is surrounded by non-optically transparent fibers 204A, 204B, and 204C. In this manner, the optically transparent fiber does not "leak" light from the side 206 and 208 of the finished yarn. The light emitting yarn 200 can be configured in a woven fabric to transmit light down the length of the yarn. In particular, light travels through the core fiber as indicated by arrows 206 and 208. The light may travel from one end 210 of the light emitting yarn to another end 212 of the light emitting yarn. Additionally, the light may travel from another end 212 of the light emitting yarn to the end 210 of the light emitting yarn. The light emitting yarn does not use electricity to transmit or propagate light. The light emitting yarn captures light from a display, and enables the transmission or propagation of the light through the fabric. The light emitting yarn 200 is woven throughout a fabric to create rows of short columns of the light emitting yarn 200. The light emanated from a display may be transmitted through the columns of the light emitting yarn 200 to emit colonnaded light from the fabric. Accordingly, the light emitting yarn 200 is to emit light that is propagated from a display and through the fabric that includes the light emitting yarn 200. The light emitting yarn 200 can transmit light from any light source that is applied to the fabric.

Figure 3A:
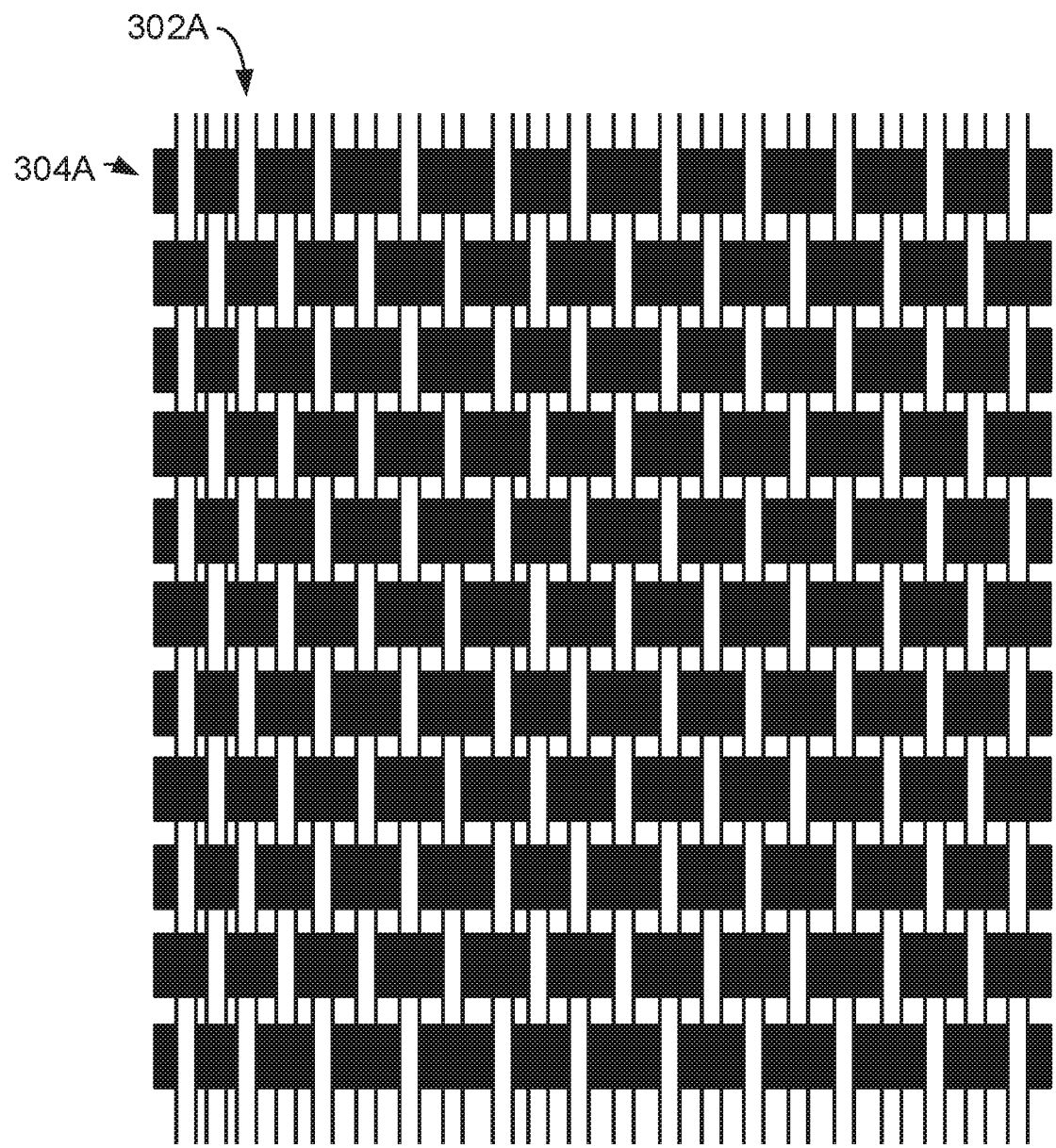
FIG. 3A is a top view of a fabric 300A that passes colonnaded light.
Figure 3B:
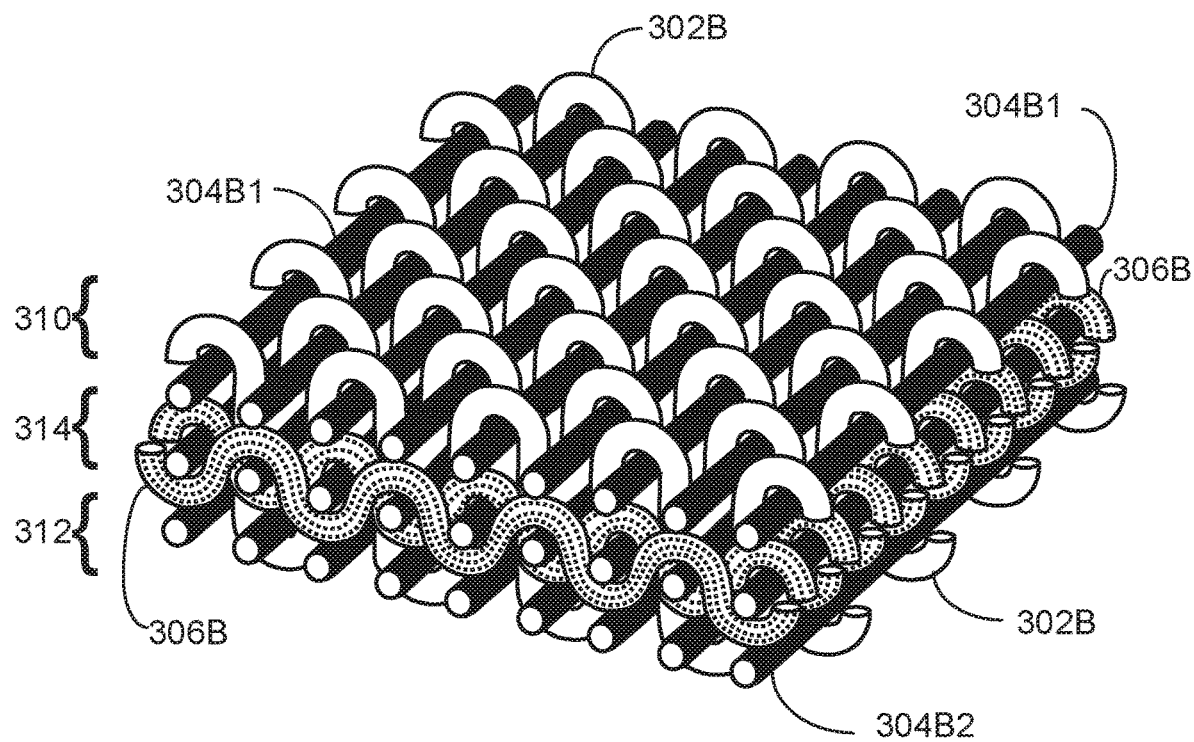
FIG. 3B is a perspective view of a fabric 300B that passes colonnaded light.
Figure 3C:
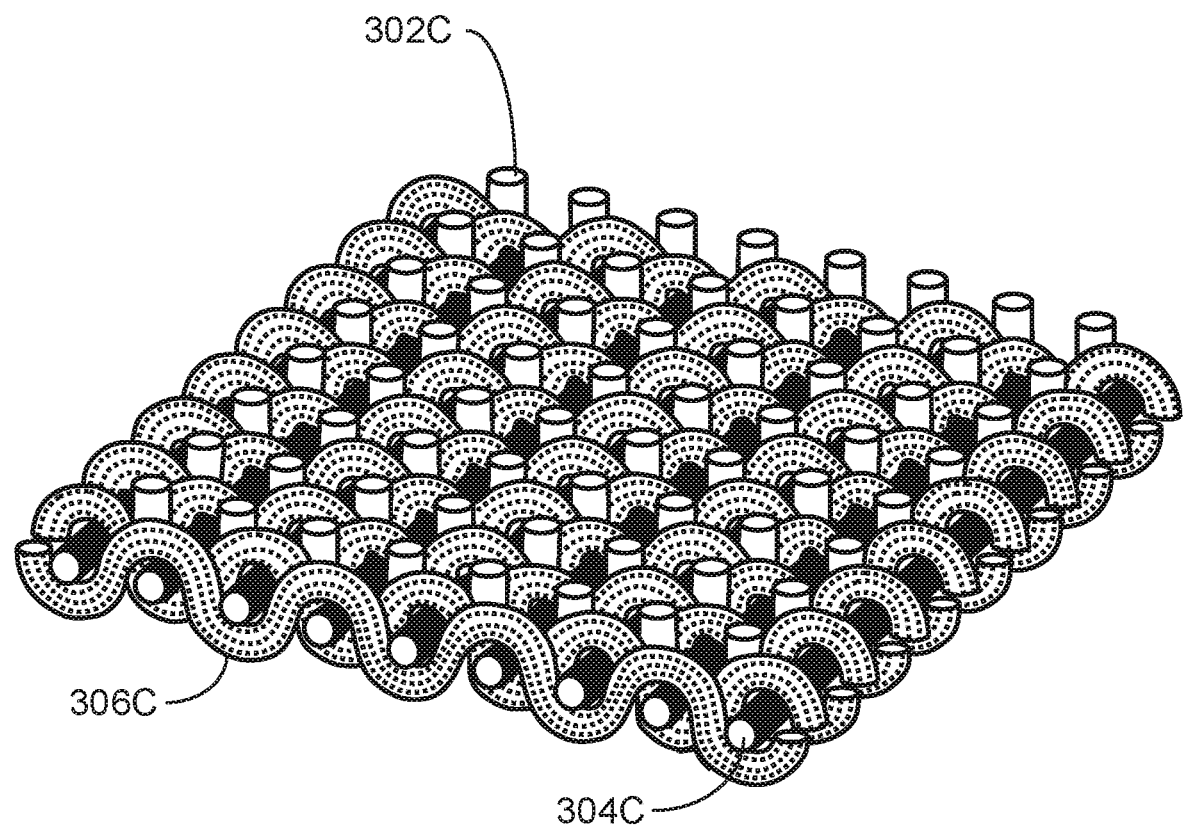
FIG. 3C is a perspective view of a finished fabric 300C that passes colonnaded light.

FIGS. 3A, 3B, and 3C illustrate the structure of a fabric that passes colonnaded light. In particular, in the fabrics 300A, 300B, and 300C, at least one light emitting yarn as described with respect to FIG. 2 may be used to create a fabric. The fabric may be formed by weaving, and may be referred to as a woven fabric. The weave of the fabric refers to a particular interlacing pattern of a warp yarn and a weft or filling yarn. Typically, during creation of a fabric, the warp yarns are held stationary in tension on a frame or loom while the transverse weft is drawn through and inserted over-and-under the warp. In examples, the light emitting yarn may function as the weft yarn. In other examples, the light emitting yarn may be woven in addition to the warp yarn and the weft yarn. Additionally, the present techniques may include the creation of a multilayer woven fabric with the light emitting yarn enabling connections of the woven layers in a third dimension or Z-direction. The weave may be, for example, a plain weave, satin weave, or twill. The fabric may also be a multi-layer woven fabric.

FIG. 3A is a top view of a fabric 300A that passes colonnaded light. In some cases, the fabric 300A may be referred to as a plain weave. The fabric 300A is woven without any finishing applied. FIG. 3A illustrates the top of fabric 300A in the x-y plane, and includes a light emitting yarn 302A that is woven with a weft yarn 304A. The light emitting yarn 302A can be used to insert optically transparent yarns throughout the woven fabric in a z-direction, not visible in FIG. 3A. The fabric 300A is illustrated prior to finishing, with a plurality of loops created over the weft yarn 304A. Thus, each time the light emitting yarn 302A crosses over the weft yarn 304A, a loop is created around the weft yarn 304A. As illustrated in FIGS. 3B and 3C below, the fabric 300A can be finished to create a number of short columns of the light emitting yarn 302A throughout the fabric 300A in the Z-direction. In examples, the light emitting yarn 302A may be cut (the loops removed) to expose an optically transparent core of the light emitting yarn 302A to propagate or transmit light through the fabric 300A. The sides of the light emitting yarn 302A prevent light from leaking from the sides the optically transparent core in the x-y plane.

FIG. 3B is a perspective view of a fabric 300B that passes colonnaded light. The fabric 300B includes a light emitting yarn 302B, weft yarn 304B, and a warp yarn 306B. In some cases, the fabric 300B may be described as a plain weave. While a particular weave of the fabric 300B that passes colonnaded light has been illustrated, any weave may be used. In FIG. 3B, the light emitting yarn 302B is woven through a plurality of weft yarn layers. In particular, the weft yarn 304B and the warp yarn 306B may be woven into a plain weave. An additional layer of weft yarns can be woven on top of and below of a fabric woven with the weft yarn 304B and the warp yarn 306B. Accordingly, weft yarns 304B1 are illustrated on top of an inner fabric woven with the weft yarn 304B and the warp yarn 3066. The weft yarns 304B2 are illustrated on bottom of an inner fabric woven with the weft yarn 304*6* and the warp yarn 306*6*. The light emitting yarn 302*6* can be woven through the inner fabric woven with the weft yarn 304*6* and the warp yarn 306*6*, using the weft yarns 30461 and the weft yarns 30462. In particular, the loops of the light emitting yarn 302B and the weft yarns 304B1 and 304B2 may form a layer of fabric 310 above and a layer of fabric 312 below the inner fabric 314 woven with the weft yarn 304B and the warp yarn 306B.

Accordingly, the fabric 300B includes loops of the light emitting yarn 302B on each side of the fabric 300B, where one side of the fabric 300B faces upwards in the z-direction and another side of the fabric 300B faces downwards in the z-direction. Thus, the light emitting yarn 306B is woven in a manner that columns of the light emitting yarn 306B occur throughout inner fabric 314 woven with the weft yarn 304B and the warp yarn 306B. The columns may occur in regular intervals or periodically throughout the fabric 300B.

After weaving the light emitting yarn 302B, the weft yarn 304B, and the warp yarns 306B into the fabric 300B, the fabric may be encapsulated. In examples, encapsulation includes applying a substance to perform a particular function on the fabric. For example, encapsulation may be used to apply conditioners or fabric softeners to the fabric 300B. Encapsulation may also be used to apply a particular finish to the fabric 300B. For example, a polyurethane (PU) material may be applied to the fabric to create a protective coating.

Accordingly, the light emitting yarn 302B can be used to create connections between layers of the woven fabric in a z-direction. In particular, layers of a plain weave fabric may be woven with a light emitting yarn woven throughout at least one layer of the plain weave fabric. In embodiments, multiple layers of the plain weave fabric may be connected by a light emitting yarn woven throughout layers of the fabric. The multi-layer fabric may be finished to generate columns of the light emitting yarn throughout a multi-layer fabric.

FIG. 3C is a perspective view of a finished fabric 300C that passes colonnaded light. The fabric 300C includes the warp yarn 306C, weft yarn 304C, and a light emitting yarn 302C. In FIG. 3C, the fabric 300C illustrates the fabric 300A and the fabric 300B after encapsulation as described above and a secondary finishing process. The secondary finishing process may be applied to the fabric 300C to expose the columns of the light emitting yarn 302C throughout the fabric 300C. The columns may occur in regular intervals or periodically throughout the fabric 300C.

Secondary finishing processes used for finishing the fabric include, for example, flattening yarns of the fabric, splitting the fabric, or skiving the fabric. For example, flattening the yarns of the fabric 300C can reduce the yarn spacing within the fabric, while also compressing the yarn thickness. Splitting or skiving the fabric may be used to remove layers of the fabric that reduces the thickness of the fabric. This will also expose a core of the light emitting yarn that is to transmit or propagate light. In examples, the fabric 300B may be split or skived to obtain the fabric 300C.

As illustrated in FIG. 3C, layers of the fabric 300B may be removed in a series of secondary finishing processes to obtain the fabric 300C. Referring to FIG. 3B, the layer of fabric 310 above and the layer of fabric 312 below the inner fabric 314 woven with the weft yarn 304B and the warp yarn 306B may be split or removed to expose the inner fabric 314. With the layers removed, the light emitting yarn 302B is cut such that a number of short columns of the light emitting yarn 302B occur throughout the remaining inner fabric 314, with the an optically transparent core of the light emitting yarn is exposed on at least two ends of the light emitting yarn.

The fabric 300C illustrates the inner fabric 314 (FIG. 3B) after the secondary finishing process is applied. The light emitting yarn 306C is configured into multiple short columns, with the optically transparent core exposed in at least one end of the column. In this manner, the secondary finishing leaves short, vertical, optically transparent fibers of the light emitting yarn 302C to transmit or propagate light from one side to the remaining side of the fabric 300C. The propagated or transmitted light through the fabric 300C may be referred to as colonnaded light. Light applied to one side of the fabric 300C will diffuse from the columns of the light emitting yarn on the remaining side of the fabric.

As described in FIGS. 3A-3C, the fabric includes a light emitting yarn, a weft yarn and the warp yarn. The light emitting yarn, weft yarn and warp yarn may be of any material or color. The light emitting yarn is able to transmit light as a result of an optically transparent core, and no contrast is needed between the other fibers or the light emitting yarn and the weft yarn and warp yarn. In examples, the picks per inch of the light emitting yarn is selected such that the other yarns of the fabric are able to block light when compared with the light emitting yarn. The picks per inch of the light emitting yarn may also be selected according to the pixel size of a display to use used as a light source with the fabric. In examples, the light emitting yarn may occur through the fabric at about 30-35 picks per inch.

While a particular weave has been used to show the process of weaving columns of light emitting yarn in a woven fabric, any type of weave can be used. For example, FIG. 3A may represent a plain weave. In a plain weave, a warp yarn and weft yarn are aligned to form a crisscross pattern. Each weft yarn crosses the warp yarn by going over one warp yarn, then under the next warp yarn, and so on. The next weft yarn goes under the warp yarn that its neighbor went over, and vice versa. Accordingly, the warp yarn and the weft yarn are used to weave fabric in an x-y plane. As illustrated, the light emitting yarn may be selectively woven throughout the fabric in a z-direction. As described herein, selectively weaving the light emitting yarn comprising weaving the light emitting yarn into the woven fabric in a particular pattern or at a particular rate.

Figure 4A:
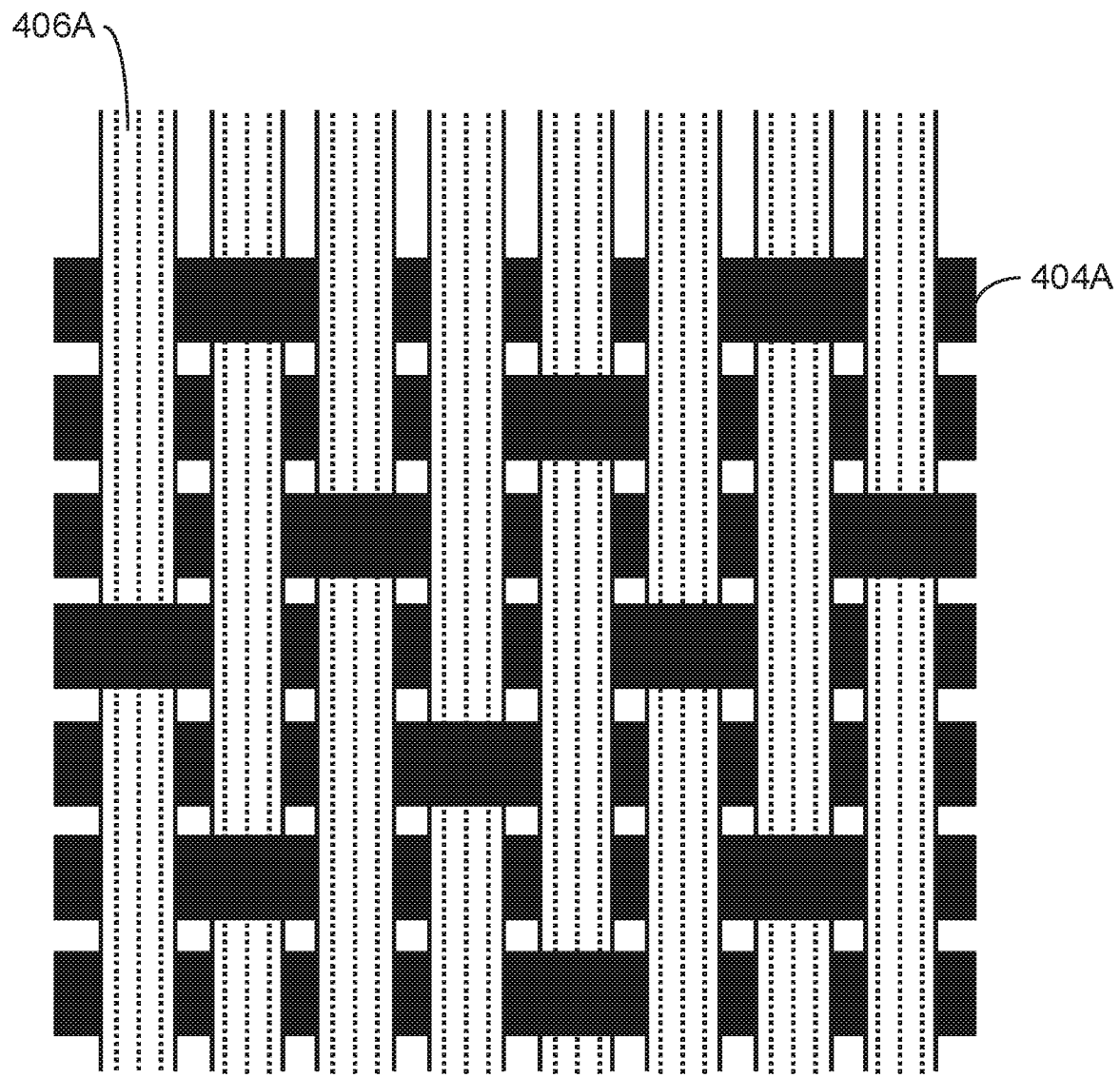
FIG. 4A illustrates a satin weave fabric 400A that passes colonnaded light.

FIG. 4A illustrates a satin weave fabric 400A that passes colonnaded light. In the satin weave fabric 400A, a number of fill or weft yarns 404A float over a warp yarn 406A and a number of warp yarns 406A float over a single weft yarn 404A. The floats are missed interfacings, where the warp yarn 406A lies on top of the weft yarns 404A in a warp-faced satin, and where the weft yarn 404A lies on top of the warp yarns 406A in weft-faced satins. The floats create the even sheen present in the satin weave that is not present in other weaves. In particular, in the satin weave the light reflecting is not scattered as much by the yarns, which have fewer tucks in a satin weave. Accordingly, the warp yarn 406A and the weft yarn 404A are used to weave fabric in an x-y plane. In examples, the warp yarn 406A and the weft yarn 404A may be used to create an inner fabric 314 (FIG. 3B). A light emitting yarn may be woven in the z-direction through the satin weave fabric 400A using additional layers of the weft yarn as described above. Similar to FIG. 3B, the satin weave fabric 400A can be finished to remove layers of the woven fabric in a manner that generates columns of the optically transparent fiber throughout the satin weave fabric 400A.

Figure 4B:
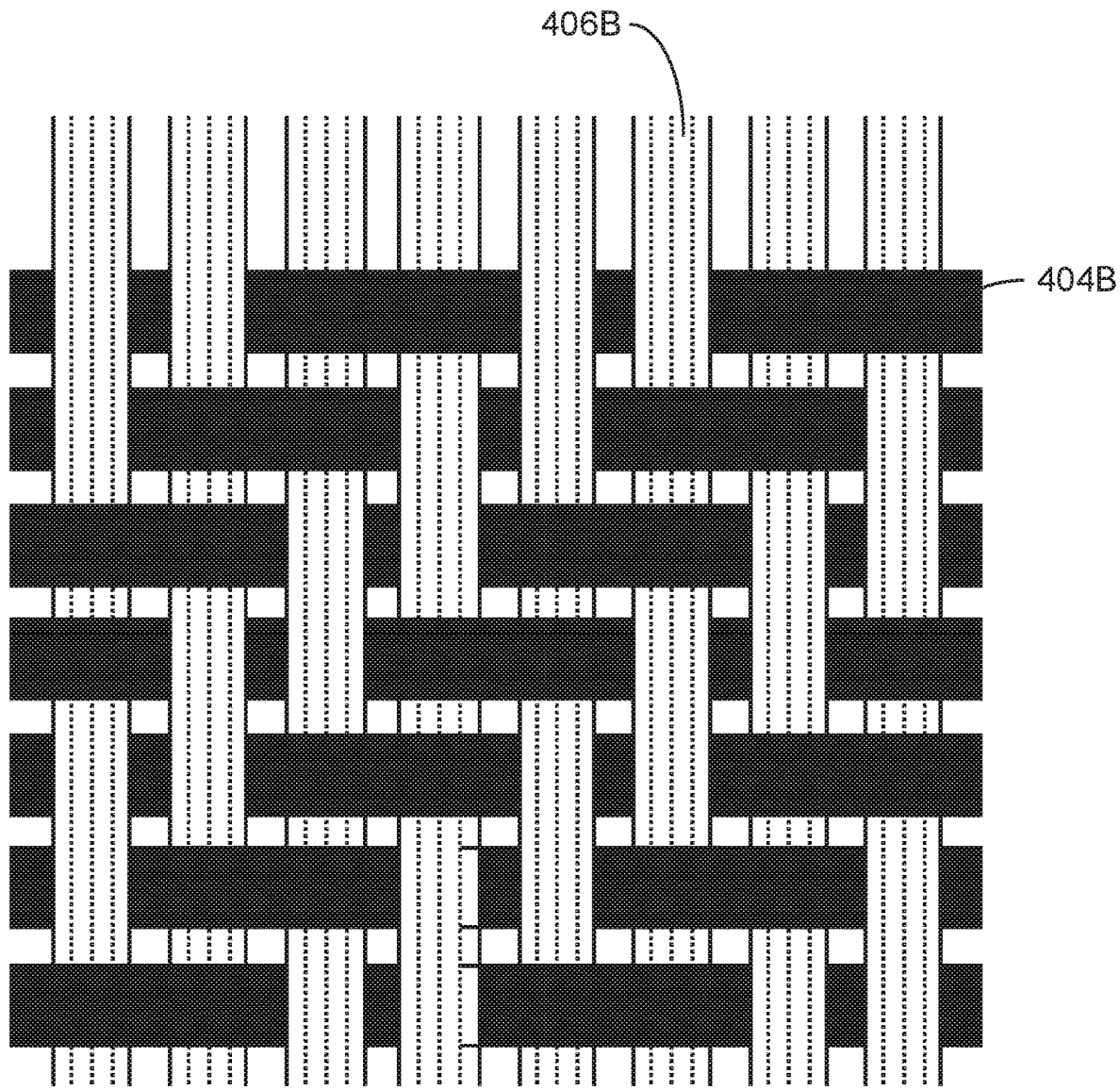
FIG. 4B illustrates a twill weave fabric 400B that passes colonnaded light.

FIG. 4B illustrates a twill weave fabric 400B that passes colonnaded light. A twill weave fabric includes pattern of diagonal parallel ribs when compared with a satin weave and a plain weave. The parallel ribs may be generated by passing the weft yarn 404B over one or more warp yarns 406B then under two or more warp yarns 406B and so on, with a "step," or offset, between rows to create the characteristic diagonal pattern. Accordingly, the warp yarn 406B and the weft yarn 404B are used to weave fabric in an x-y plane. In examples, the warp yarn 406B and the weft yarn 404B may be used to create an inner fabric 314 (FIG. 3B). A light emitting yarn may be woven in the z-direction through the twill weave fabric 400B using additional layers of the weft yarn as described above. Similar to FIG. 3B, the twill weave fabric 400B can be finished to remove layers of the woven fabric in a manner that generates columns of the optically transparent fiber throughout the twill weave fabric 400B.

Figure 5:
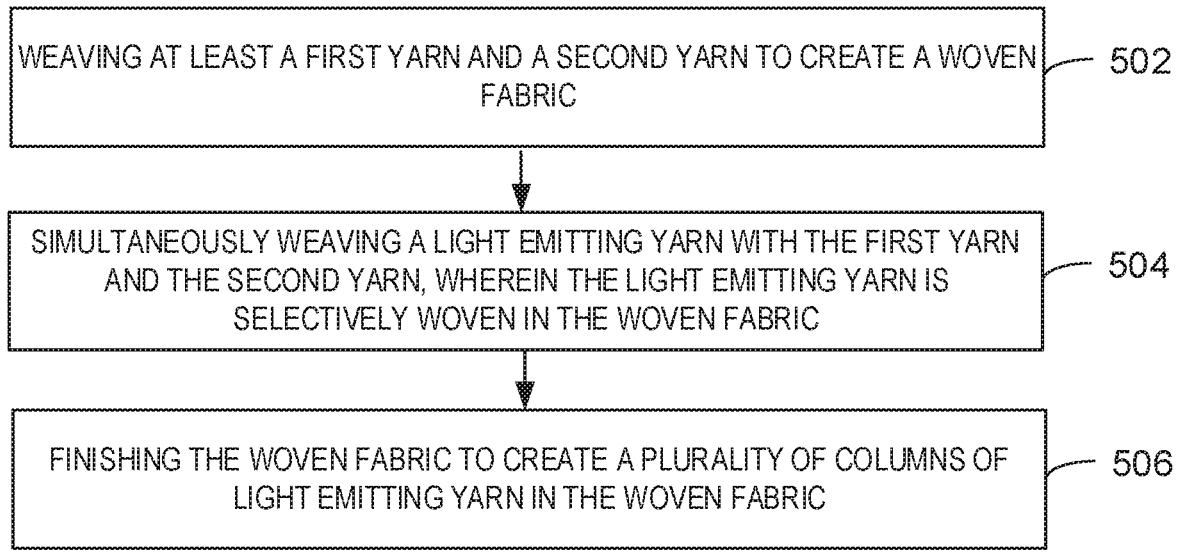
FIG. 5 is a process flow diagram of an example method for manufacturing a fabric that passes colonnaded light.

FIG. 5 is a process flow diagram of an example method for manufacturing a fabric that passes colonnaded light. The method 500 can be implemented with any suitable computing device, such as the computing system 602 of FIG. 6.

At block 502, the method 500 can include weaving at least a first yarn and a second yarn to create a woven fabric. The first yarn and the second yarn may be made of any material, such as a non-optically transparent yarn. In this manner, the first yarn and the second yarn may be used to block light from passing through the fabric in areas with the first yarn and the second yarn. In some examples, the first yarn and the second yarn may be woven in a particular pattern.

At block 504, the method 500 can include weaving a light emitting yarn with the first yarn and the second yarn when creating the woven fabric. The light emitting yarn can create a plurality of loops of light emitting yarn on at least one side of the woven fabric. In some examples, the light emitting yarn can include any suitable yarn that can transmit light.

At block 506, the method 500 can include finishing the woven fabric to eliminate the plurality of loops of the light emitting yarn to create vertical columns of light emitting yarn throughout the fabric. In examples, finishing the woven fabric includes applying a secondary process that is to split or skive the woven fabric. In some examples, the fabric can be woven based on a particular design that is to pass light. For example, the areas of the fabric that are designed to pass light may include a higher number of light emitting yarns.

In one embodiment, the process flow diagram of FIG. 5 is intended to indicate that the steps of the method 500 are to be executed in a particular order. Alternatively, in other embodiments, the steps of the method 500 can be executed in any suitable order and any suitable number of the steps of the method 500 can be included. Further, any number of additional steps may be included within the method 500, depending on the specific application. For example, the method 500 can also include cutting any suitable number of openings or holes in the finished fabric. The holes can enable access to components of the electronic device covered by the fabric. For example, the openings may expose the feet or a microphone of an electronic device covered by the fabric.

FIG. 6 is a block diagram of an example of a computing system that can be used to fabricate a fabric that passes colonnaded light. The example system 600 includes a computing device 602. The computing device 602 includes a processing unit 604, a system memory 606, and a system bus 608. In some examples, the computing device 602 can be a gaming console, a personal computer (PC), an accessory console, a gaming controller, among other computing devices. In some examples, the computing device 602 can be a node in a cloud network.

The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structure, including the memory bus or memory controller, a peripheral bus or external bus, and a local bus using any variety of available bus architectures known to those of ordinary skill in the art. The system memory 606 includes computer-readable storage media that includes volatile memory 610 and nonvolatile memory 612.

The basic input/output system (BIOS), containing the basic routines to transfer information between elements within the computer 602, such as during start-up, is stored in nonvolatile memory 612. By way of illustration, and not limitation, nonvolatile memory 612 can include read-only memory (ROM), programmable ROM (PROM), electrically programmable ROM (EPROM), electrically erasable programmable ROM (EEPROM), or flash memory.

Volatile memory 610 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 602 also includes other computer-readable media, such as removable/non-removable, volatile/nonvolatile computer storage media. FIG. 6 shows, for example a disk storage 614. Disk storage 614 includes, but is not limited to, devices like a magnetic disk drive, floppy disk drive, tape drive, Jaz drive, Zip drive, flash memory card, or memory stick.

In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 614 to the system bus 608, a removable or non-removable interface is typically used such as interface 616.

It is to be appreciated that FIG. 6 describes software that acts as an intermediary between users and the basic computer resources described in the suitable operating environment 600. Such software includes an operating system 618. Operating system 618, which can be stored on disk storage 614, acts to control and allocate resources of the computer 602.

System applications 620 take advantage of the management of resources by operating system 618 through program modules 622 and program data 624 stored either in system memory 606 or on disk storage 614. It is to be appreciated that the disclosed subject matter can be implemented with various operating systems or combinations of operating systems.

A user enters commands or information into the computer 602 through input devices 626. Input devices 626 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 626 connect to the processing unit 604 through the system bus 608 via interface ports 628. Interface ports 628 include, for example, a serial port, a parallel port, a game port, and a universal serial bus (USB).

Output devices 630 use some of the same type of ports as input devices 626. Thus, for example, a USB port may be used to provide input to the computer 602 and to output information from computer 602 to an output device 630.

Output adapter 632 is provided to illustrate that there are some output devices 630 like monitors, speakers, and printers, among other output devices 630, which are accessible via adapters. The output adapters 632 include, by way of illustration and not limitation, video and sound cards that provide a means of connection between the output device 630 and the system bus 608. It can be noted that other devices and systems of devices provide both input and output capabilities such as remote computing devices 634. The output devices 630 can also include any suitable fabrication device, such as a three-dimensional printer, which can generate three dimensional objects based on fabrication instructions transmitted from the computer 602. Output devices may also include an automated loom to create a fabric that passes colonnaded light that is controlled by the computer 602.

The computer 602 can be a server hosting various software applications in a networked environment using logical connections to one or more remote computers, such as remote computing devices 634. The remote computing devices 634 may be client systems configured with web browsers, PC applications, mobile phone applications, and the like. The remote computing devices 634 can be a personal computer, a server, a router, a network PC, a workstation, a microprocessor-based appliance, a mobile phone, a peer device or other common network node and the like, and typically includes many or all of the elements described relative to the computer 602. In some embodiments, the remote computing devices 634 can also include any suitable fabrication device that can manufacture a fabric such as a fabric that passes colonnaded light as described herein.

Remote computing devices 634 can be logically connected to the computer 602 through a network interface 636 and then connected via a communication connection 638, which may be wireless. Network interface 636 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 638 refers to the hardware/software employed to connect the network interface 636 to the bus 608. While communication connection 638 is shown for illustrative clarity inside computer 602, it can also be external to the computer 602. The hardware/software for connection to the network interface 636 may include, for exemplary purposes, internal and external technologies such as, mobile phone switches, modems including regular telephone grade modems, cable modems and DSL modems, ISDN adapters, and Ethernet cards.

The computer 602 can further include a radio 640. For example, the radio 640 can be a wireless local area network radio that may operate one or more wireless bands. For example, the radio 640 can operate on the industrial, scientific, and medical (ISM) radio band at 2.4 GHz or 5 GHz. In some examples, the radio 640 can operate on any suitable radio band at any radio frequency.

The computer 602 includes one or more modules 622, such as a colonnaded fabric designer 642 and a colonnaded fabric fabricator 644. In some embodiments, the colonnaded fabric designer 642 can determine the picks per inch of the light emitting yarn to be in the fabric. For example, the colonnaded fabric designer 642 may analyze a display type to be used as a light source of the fabric, and determine the picks per inch of the fabric to pass colonnaded light from the display. The colonnaded fabric designer may also be used to determine the location of openings in the fabric to allow access to components of the electronic device to be covered by the fabric.

In some embodiments, the colonnaded fabric fabricator 644 can transmit instructions to a fabrication device to weave a fabric that passes colonnaded light with specifications as determined by the colonnaded fabric designer 642. Additionally, the colonnaded fabric fabricator 644 can transmit instructions to a finishing device. After weaving the fabric, a finishing device may be used to encapsulate the fabric. The finishing device pay also split or skive the fabric as necessary.

It is to be understood that the block diagram of FIG. 6 is not intended to indicate that the computing system 602 is to include all of the components shown in FIG. 6. Rather, the computing system 602 can include fewer or additional components not illustrated in FIG. 6 (e.g., additional applications, additional modules, additional memory devices, additional network interfaces, etc.).

EXAMPLES

Example 1 is a method for manufacturing fabric that passes colonnaded light. The method includes weaving a first yarn and a second yarn to create a woven fabric; weaving a light emitting yarn through the woven fabric, wherein the light emitting yarn creates a plurality of loops of light emitting yarn on at least one side of the woven fabric; and finishing the woven fabric to create columns of light emitting yarn throughout the fabric by removing the plurality of loops.

Example 2 includes the method of example 1, including or excluding optional features. In this example, finishing the woven fabric comprises encapsulating the fabric prior to removing the plurality of loops.

Example 3 includes the method of any one of examples 1 to 2, including or excluding optional features. In this example, the finishing the woven fabric comprises splitting or skiving the fabric.

Example 4 includes the method of any one of examples 1 to 3, including or excluding optional features. In this example, weaving a light emitting yarn through the woven fabric comprises weaving at least one additional layer of weft yarns with the light emitting yarn.

Example 5 includes the method of any one of examples 1 to 4, including or excluding optional features. In this example, the woven fabric is an inner fabric, and weaving a light emitting yarn through the woven fabric comprises weaving at least one additional layer of weft yarns with the light emitting yarn, and finishing the woven fabric comprises removing the one additional layer to create columns of light emitting yarn in the woven fabric with an optical core exposed.

Example 6 includes the method of any one of examples 1 to 5, including or excluding optional features. In this example, method of claim 1, finishing the woven fabric comprises flattening the fabric.

Example 7 includes the method of any one of examples 1 to 6, including or excluding optional features. In this example, light emitting yarn is between thirty and thirty-five picks per inch of the woven fabric.

Example 8 includes the method of any one of examples 1 to 7, including or excluding optional features. In this example, the woven fabric is a plain-woven fabric.

Example 9 includes the method of any one of examples 1 to 8, including or excluding optional features. In this example, the woven fabric is a twill woven fabric.

Example 10 includes the method of any one of examples 1 to 9, including or excluding optional features. In this example, the woven fabric is a satin woven fabric.

Example 11 includes the method of any one of examples 1 to 10, including or excluding optional features. In this example, method of claim 1, where the light emitting yarn comprises an optically transparent core to transmit light from being gathered at a first end of the light emitting yarn and released at a second end of the light emitting yarn.

Example 12 is a fabric that passes colonnaded light. The fabric that passes colonnaded light includes a first yarn; a second yarn; and a light emitting yarn, wherein the first yarn and the second yarn create a woven fabric, and the light emitting yarn is woven throughout the woven fabric and the woven fabric with the light emitting yarn is finished to create columns of the light emitting yarn throughout the woven fabric.

Example 13 includes the fabric that passes colonnaded light of example 12, including or excluding optional features. In this example, finishing the woven fabric with the light emitting yarn comprises encapsulating the fabric.

Example 14 includes the fabric that passes colonnaded light of any one of examples 12 to 13, including or excluding optional features. In this example, the finishing the woven fabric comprises splitting or skiving the woven fabric to expose an optically transparent fiber of the light emitting yarn.

Example 15 includes the fabric that passes colonnaded light of any one of examples 12 to 14, including or excluding optional features. In this example, weaving the light emitting yarn throughout the woven fabric comprises weaving at least one additional layer of weft yarns with the light emitting yarn through the woven fabric.

Example 16 includes the fabric that passes colonnaded light of any one of examples 12 to 15, including or excluding optional features. In this example, the woven fabric is an inner fabric, and weaving the light emitting yarn throughout the woven fabric comprises weaving at least one additional layer of weft yarns with the light emitting yarn through the woven fabric, and finishing the woven fabric comprises removing the one additional layer to create columns of light emitting yarn in the woven fabric with an optically transparent fiber of the light emitting yarn exposed.

Example 17 is an electronic device. The electronic device includes at least one display configured to render information via light emitted by a plurality of pixels; and a fabric that passes colonnaded light positioned to cover the at least one display, wherein the fabric is a woven fabric that comprises columns of a light emitting yarn throughout the fabric, wherein the light emitting yarn is to capture the light emitted by the plurality of pixels at a first end, transmit the light through the fabric via the light emitting yarn, and release the light at a second end of the light emitting yarn.

Example 18 includes the electronic device of example 17, including or excluding optional features. In this example, the display is a light-emitting diode display.

Example 19 includes the electronic device of any one of examples 17 to 18, including or excluding optional features. In this example, the fabric is to completely cover the electronic device.

Example 20 includes the electronic device of any one of examples 17 to 19, including or excluding optional features. In this example, the fabric is bonded to the electronic device.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for manufacturing fabric that passes colonnaded light, comprising:
   weaving a weft yarn extending in a first direction and a warp yarn extending in a second direction to create a woven fabric having a front surface and a back surface;
   weaving a light emitting yarn through the woven fabric, wherein the light emitting yarn creates a plurality of loops of light emitting yarn on at least one side of the woven fabric; and
   finishing the woven fabric to create columns of light emitting yarn through the fabric by removing the plurality of loops, the columns of the light emitting yarn extending substantially orthogonal to the first direction and the second direction and between the front surface and the back surface of the woven fabric.

2. The method of claim 1, wherein finishing the woven fabric comprises encapsulating the fabric prior to removing the plurality of loops.

3. The method of claim 1, wherein the finishing the woven fabric comprises splitting or skiving the fabric.

4. The method of claim 1, wherein weaving a light emitting yarn through the woven fabric comprises weaving at least one additional layer of weft yarns with the light emitting yarn.

5. The method of claim 1, wherein the woven fabric is an inner fabric, and weaving a light emitting yarn through the woven fabric comprises weaving at least one additional layer of weft yarns with the light emitting yarn, and finishing the woven fabric comprises removing the at least one additional layer to create columns of light emitting yarn in the woven fabric with an optical core exposed.

6. The method of claim 1, finishing the woven fabric comprises flattening the fabric.

7. The method of claim 1, wherein light emitting yarn is between thirty and thirty-five picks per inch of the woven fabric.

8. The method of claim 1, wherein the woven fabric is a plain-woven fabric.

9. The method of claim 1, wherein the woven fabric is a twill woven fabric.

10. The method of claim 1, wherein the woven fabric is a satin woven fabric.

11. The method of claim 1, where the light emitting yarn comprises an optically transparent core to transmit light from being gathered at a first end of the light emitting yarn and released at a second end of the light emitting yarn.

12. The method of claim 1, wherein the weaving of the light emitting yarn is done while the weft yarn and the warp yarn are weaved.

13. A fabric configured to pass colonnaded light, comprising:
    a weft yarn extending in a first direction;
    a warp yarn extending in a second direction woven with the weft yarn to create a woven fabric having a front surface and a back surface; and
    a light emitting yarn that is woven through the woven fabric, the woven fabric with the light emitting yarn being finished to create columns of the light emitting yarn through the woven fabric, the columns of the light emitting yarn extending substantially orthogonal to the first direction and the second direction and between the front surface and the back surface of the woven fabric.

14. The fabric of claim 13, wherein finishing the woven fabric with the light emitting yarn comprises encapsulating the fabric.

15. The fabric of claim 13, wherein finishing the woven fabric comprises splitting or skiving the woven fabric to expose an optically transparent fiber of the light emitting yarn.

16. The fabric of claim 13, wherein weaving the light emitting yarn through the woven fabric comprises weaving at least one additional layer of weft yarns with the light emitting yarn through the woven fabric.

17. The fabric of claim 13, wherein the woven fabric is an inner fabric, and weaving the light emitting yarn through the woven fabric comprises weaving at least one additional layer of weft yarns with the light emitting yarn through the woven fabric, and finishing the woven fabric comprises removing the at least one additional layer to create columns of light emitting yarn in the woven fabric with an optically transparent fiber of the light emitting yarn exposed.

18. An electronic device, comprising:
    at least one display configured to render information via light emitted by a plurality of pixels; and
    a fabric that passes colonnaded light positioned to cover the at least one display, wherein the fabric is a woven fabric having a weft yarn extending in a first direction and a warp yarn extending in a second direction woven with the weft yarn to create the woven fabric having a front surface and a back surface, the woven fabric including columns of a light emitting yarn through the fabric, wherein the light emitting yarn is to capture the light emitted by the plurality of pixels at a first end, transmit the light through the fabric via the light emitting yarn, and release the light at a second end of the light emitting yarn, the columns of the light emitting yarn extending substantially orthogonal to the first direction and the second direction and between the front surface and the back surface of the woven fabric.

19. The electronic device of claim 18, wherein the display is a light-emitting diode display.

20. The electronic device of claim 18, wherein the fabric is to completely cover the electronic device.

21. The electronic device of claim 18, wherein the fabric is bonded to the electronic device.

* * * * *